United States Patent [19]
Hirano

[11] Patent Number: 5,267,086
[45] Date of Patent: Nov. 30, 1993

[54] SOFT FOCUS LENS SYSTEM
[75] Inventor: Hiroyuki Hirano, Tokyo, Japan
[73] Assignee: Asahi Kogaku Kogyo K.K., Tokyo, Japan
[21] Appl. No.: 599,965
[22] Filed: Oct. 19, 1990
[30] Foreign Application Priority Data Oct. 25, 1989 [JP] Japan .................. 1-277895

[51] Int. Cl.$^5$ .......................... G02B 13/20; G02B 9/04
[52] U.S. Cl. ...................................... 359/707; 359/795
[58] Field of Search ............... 359/676, 707, 683, 691, 359/692, 698, 793, 795

[56] References Cited

U.S. PATENT DOCUMENTS 4,124,276 11/1978 Okano et al. .
4,310,221 1/1982 Momiyama et al. ................. 359/707

FOREIGN PATENT DOCUMENTS 2217029 10/1973 Fed. Rep. of Germany .
2851688 8/1984 Fed. Rep. of Germany .
55-129308 12/1975 Japan .
52-141223 5/1976 Japan .
54-156531 5/1978 Japan .
56-50309 10/1979 Japan .
1-211712 2/1988 Japan .
198569 6/1923 United Kingdom .
917891 2/1963 United Kingdom .
1208970 10/1970 United Kingdom .
2036366 6/1980 United Kingdom .

OTHER PUBLICATIONS

European Search Report—9022685.3—Nov. 16, 1990.
"Optik fur Konstrukteure" by Dr. Helmut Naumann, p. 58.

Primary Examiner—Bruce Y. Arnold
Assistant Examiner—Hung Dang
Attorney, Agent, or Firm—Sughrue, Mion, Zinn, Macpeak & Seas

[57] ABSTRACT

An autofocusable soft focus lens system includes a movable front lens group having a positive power, and a stationary rear lens group having a negative power.

17 Claims, 6 Drawing Sheets

SOFT FOCUS LENS SYSTEM

BACKGROUND OF THE INVENTION

This invention relates to a soft focus lens system for use in photography.

Soft focus lens systems are known to produce unique shooting characteristics, and various types have so far been proposed to fully exploit those characteristics. See, for example, Japanese Kokai Nos. 141223/1977, 50309/1981, 156531/1989, 129308/1980, 112144/1987 and 211712/1989.

In most cases, however, the prior art soft focus lens systems have a nearest distance image magnification (which is hereinafter referred to simply as "image magnification") of no more than about 1/10, so when they are used to photograph small objects such as flowers rather than portraits and scenery, sufficiently good results cannot be attained in closeup shooting. It is true that soft focus lens systems capable of shooting up to an image magnification of about ¼ are available in the art, but they suffer from the disadvantage of undesirably great amounts of lens advancement since the overall system has to be moved to perform focusing. In addition, the lens barrel used has a complex construction and is not only bulky but also heavy.

As an increasing number of modern cameras are provided with an autofocusing capability, there has been a growing demand for autofocusable soft focus lenses since it is inherently difficult to bring them into focus. An imaging system that partly meets this need has been proposed in Japanese Kokai No. 112114/1987, supra, but this system adopts a complex lens composition and attains an image magnification of no more than about 1/10.

SUMMARY OF THE INVENTION

The present invention has been developed in order to solve the aforementioned problems of the prior art, and its principal object is to provide an improved soft focus lens system that has a brightness on the order of $F_{NO}=1:2.8$ and which has a viewing angle on the order of 28 degrees. This lens system is capable of closeup shooting up to a magnification of about ⅓, has a lens group that is lightweight and which needs to be advanced by only a small amount to effect focusing, has a simple barrel construction, and yet provides a satisfactory soft focus effect for the entire part of the film.

To attain the aforementioned object, the soft focus lens system of the present invention comprises a front lens group having a positive overall power and a rear lens group having a negative overall power, and only the front lens group is moved to perform focusing while the rear lens group remains fixed.

In order to insure particularly good performance, the front lens group comprises, from the object side, a positive first lens, a negative second lens (which first and second lenses may be cemented), a negative third lens and a positive fourth lens (which third and fourth lenses may be cemented), and further satisfies the following conditions:

$$0.25 < r_1/f < 0.50 \quad (1)$$

$$10 < \nu_1 - \nu_2 < 30 \quad (2)$$

$$0.7 < f_F/f < 0.92 \quad (3)$$

In another embodiment, the rear lens group is solely composed of a single negative lens element (i.e., a fifth lens) and satisfies the following conditions:

$$0.1 < -f/f_R - 0.5 \quad (4)$$

$$55 < \nu_5 \quad (5)$$

The respective symbols used in conditions (1)–(5) have the following definitions:
f: the focal length of the overall lens system at infinity;
$r_1$: the radius of curvature of the first surface of the first lens;
$\nu_i$: the Abbe number of the ith lens;
$f_F$: the focal length of the front lens group; and
$f_R$: the focal length of the rear lens group

DETAILED DESCRIPTION OF THE PREFERRED EMBODIMENT

Figure 1:
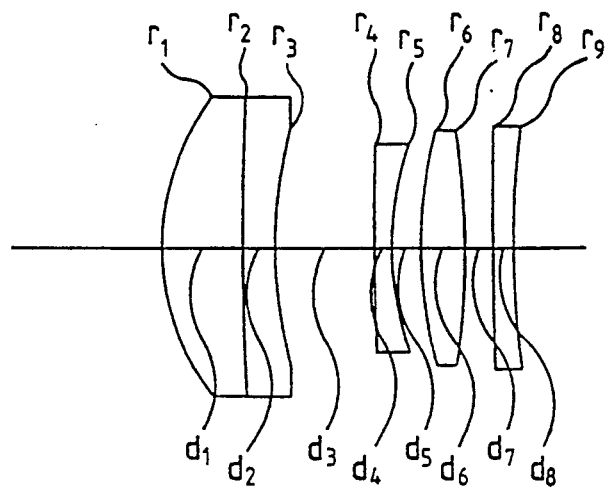
FIGS. 1, 5 and 9 are simplified cross-sectional views of lens systems constructed according to Examples 1, 2 and 3 below, respectively, which are focused at infinity.
Figure 2:
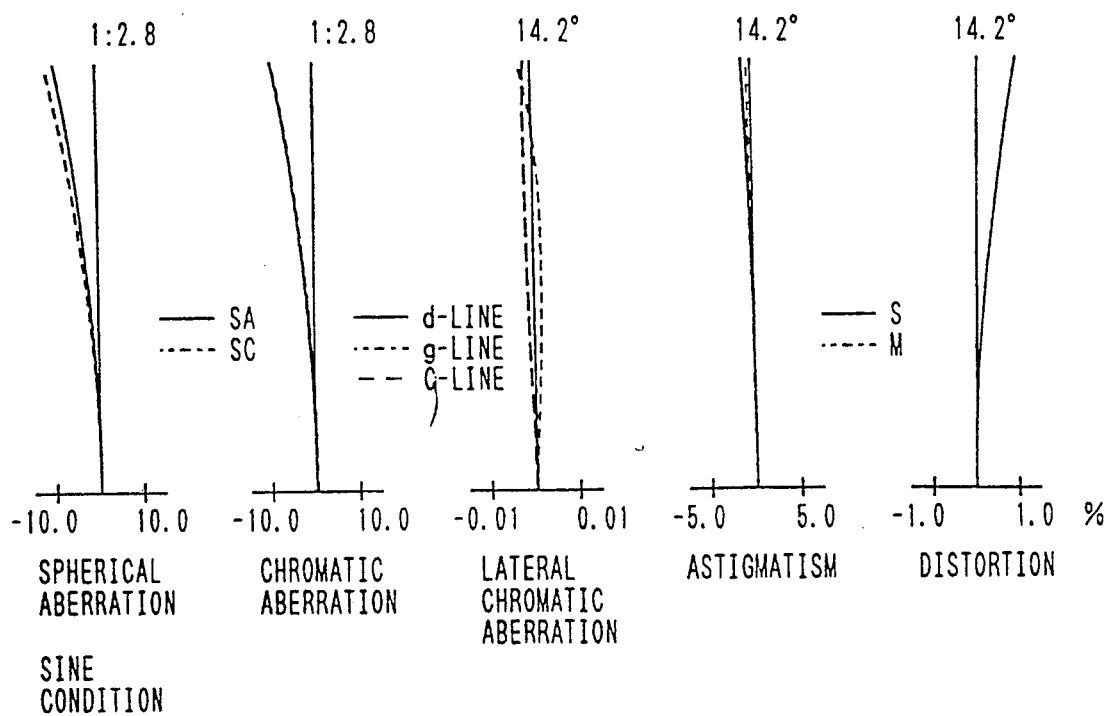
FIGS. 2, 6 and 10 are graphs plotting the aberration curves obtained with the lens systems of Examples 1, 2 and 3, respectively, focused at infinity.
Figure 3:
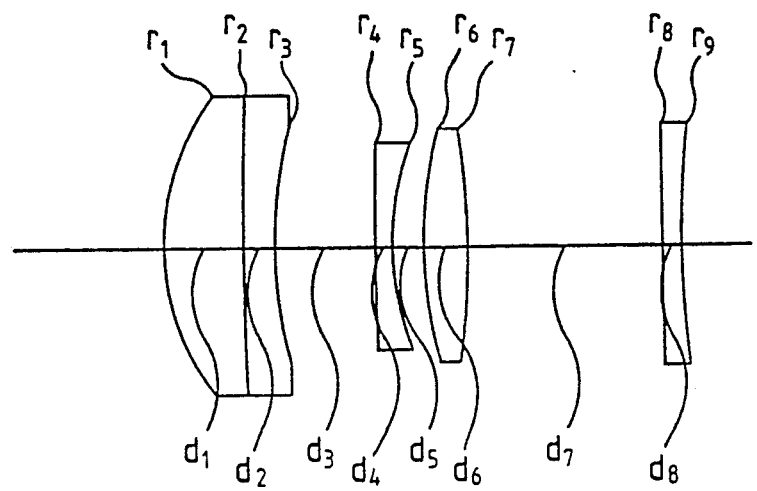
FIGS. 3, 7 and 11 are simplified cross-sectional views of the lens systems constructed according to Examples 1, 2 and 3, respectively, which are focused for an image magnification of about ⅓.
Figure 4:
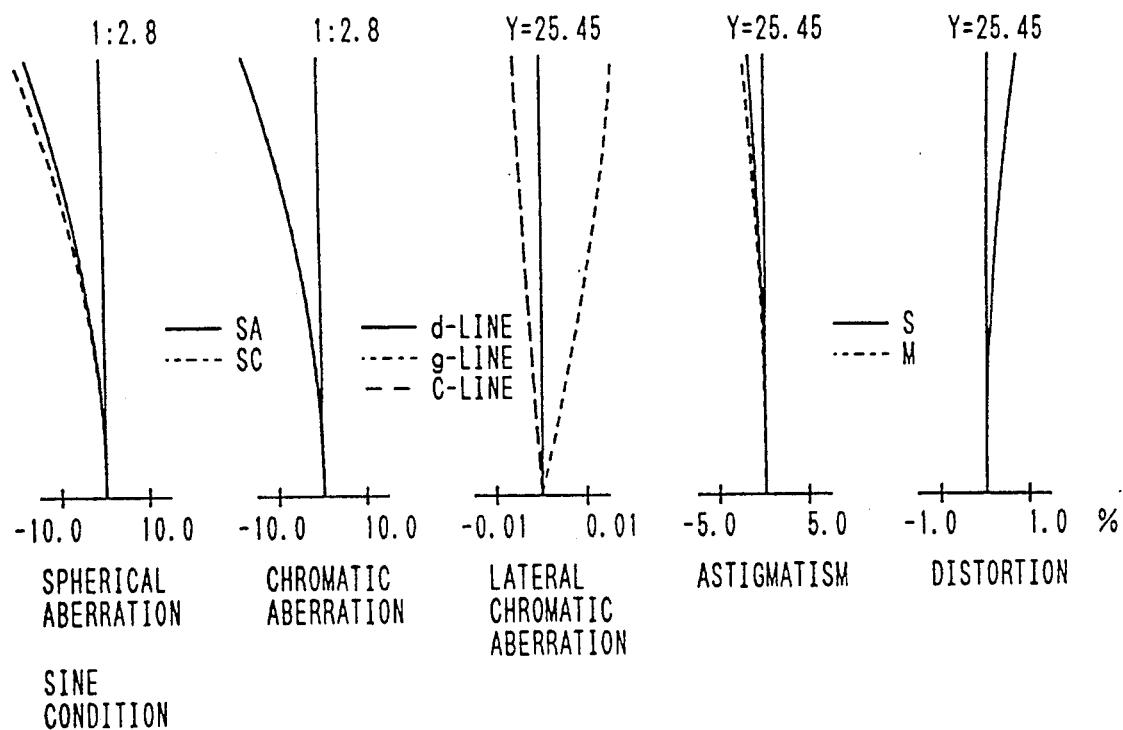
FIGS. 4, 8 and 12 are graphs plotting the aberration curves obtained with the lens systems of Examples 1, 2 and 3, respectively, focused for an image magnification of about ⅓.
Figure 5:
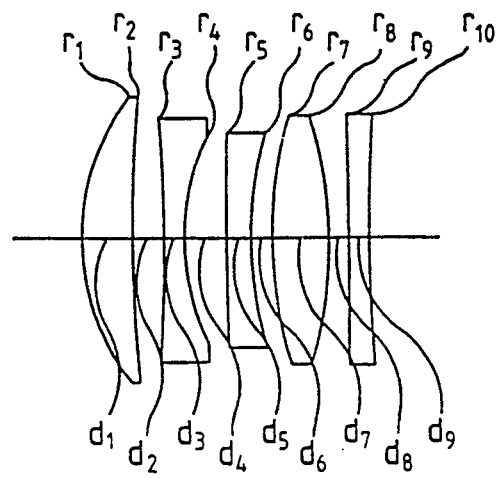
Figure 6:
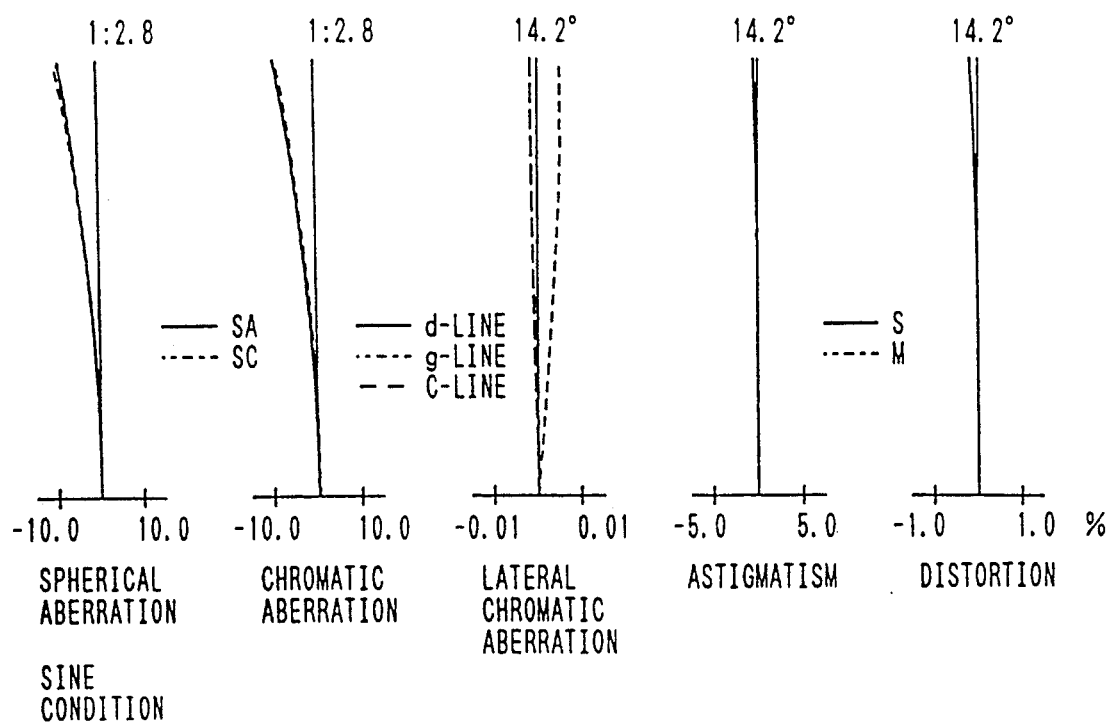
Figure 7:
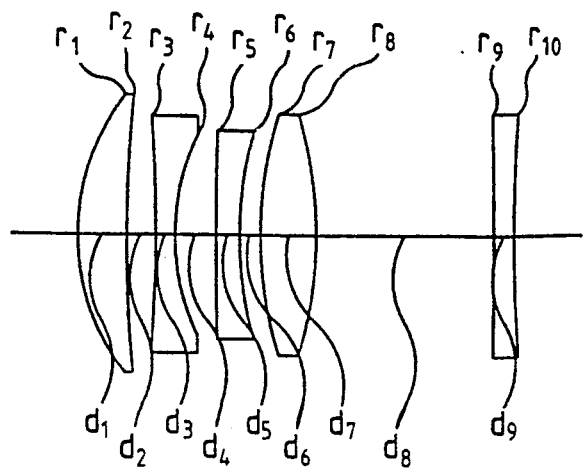
Figure 8:
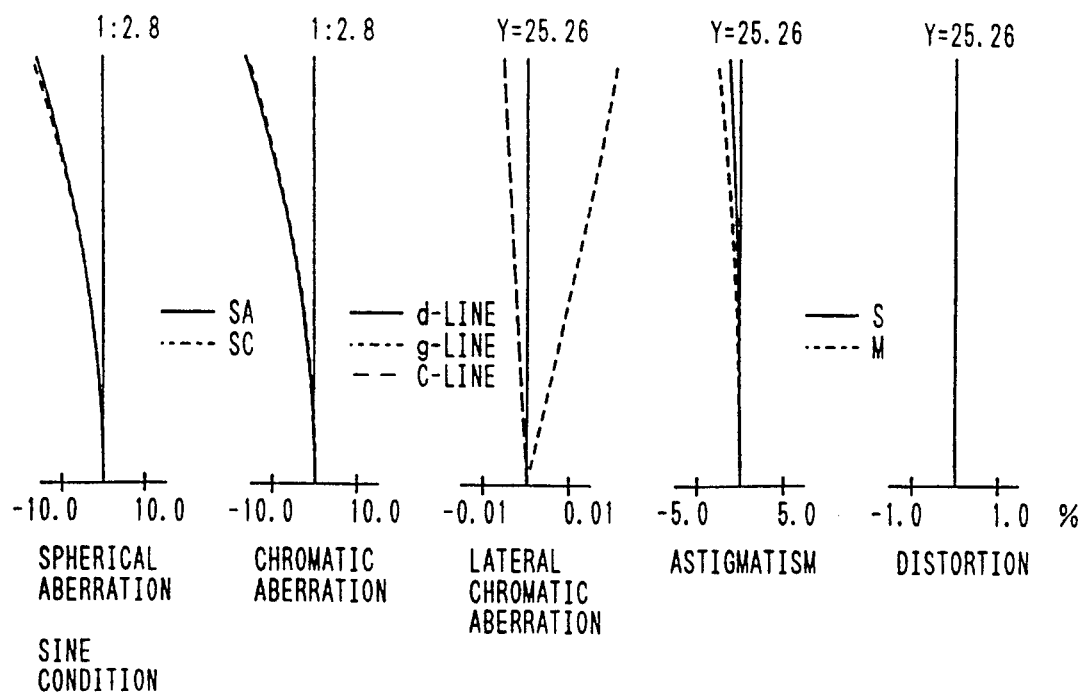
Figure 9:
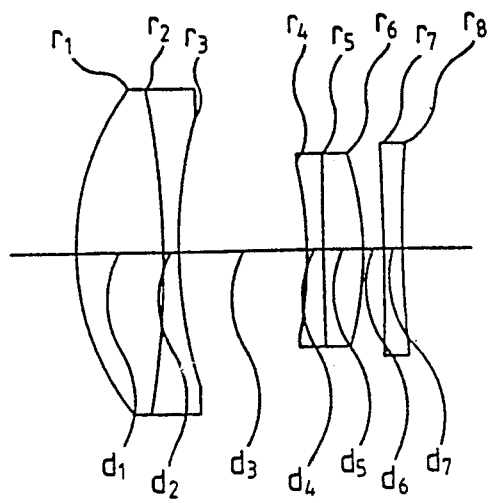
Figure 10:
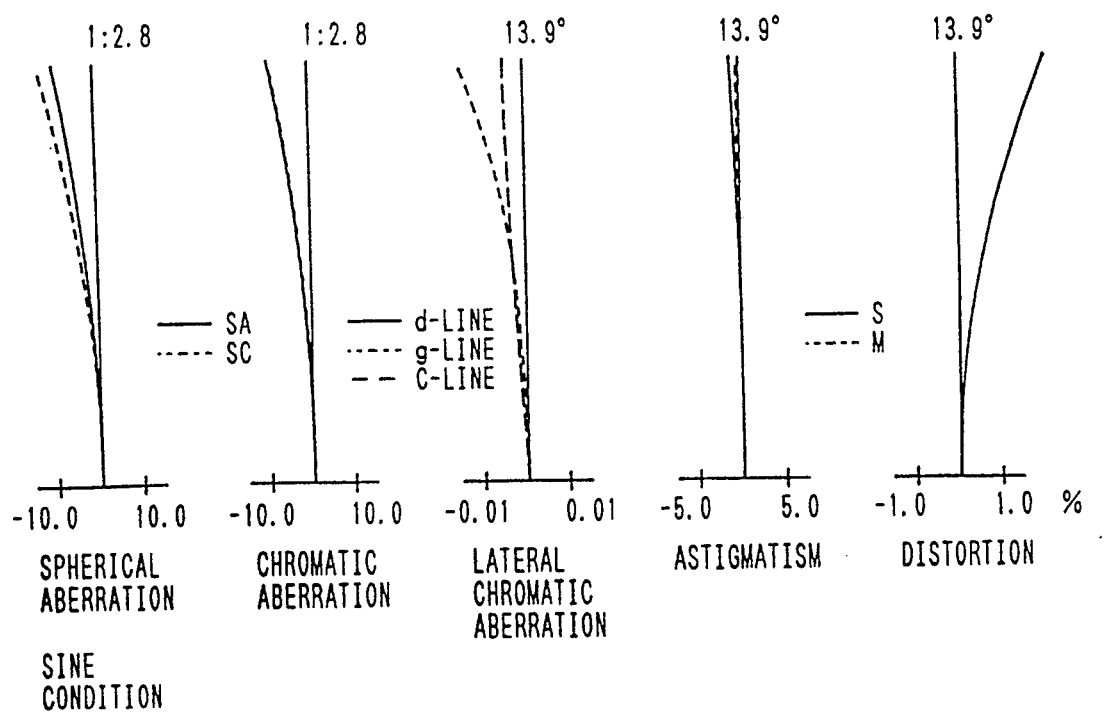
Figure 11:
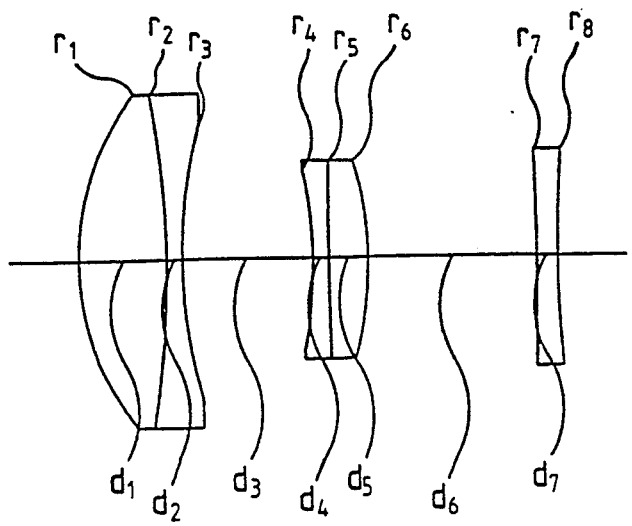
Figure 12:
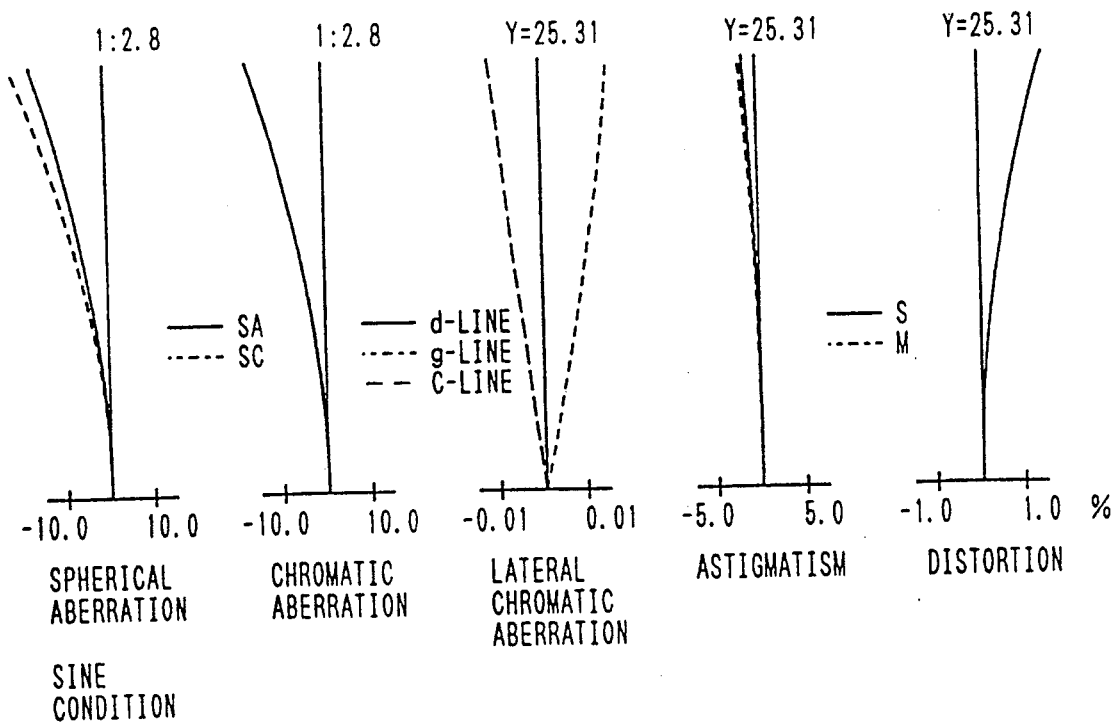

The soft focus lens system of the present invention comprises a front lens group having a positive power and a rear lens group having a negative power, with only the front lens group being moved to effect focusing. Because of this arrangement, the amount by which the moving lens group needs to be advanced is small and, in addition, this lens group is mechanically simple and lightweight to thus render the soft focus lens system suitable for use with an autofocus camera.

The criticality of the individual conditions (1)–(5) is described below.

Condition (1) relates to the spherical aberration that will be produced at the first surface of the front lens group. If the upper limit of this condition is exceeded, the development of a spherical aberration is so small that the lens system of the invention will not work effectively as a soft focus lens. Conversely, if the lower limit of condition (1) is not reached, aberrations other than a spherical aberration such as coma will develop at the first surface of the front lens group too extensively to be compensated effectively.

Condition (2) relates to chromatic aberration. It becomes difficult to effectively compensate for chromatic aberration if the upper limit of this condition is exceeded or if the lower limit thereof is not reached.

Condition (3) relates to the amount of movement of the front lens group. If the upper limit of this condition is exceeded, the front lens group has to be moved by such a great amount that one of the intended advantages of the invention (i.e., the need to advance the moving lens group by only a small amount) cannot be attained. If, conversely, the lower limit of condition (3) is not reached, the necessary amount of front lens group movement is reduced, but the image magnification by the rear lens group is increased to amplify the aberrations that develop in the front lens group, and it becomes difficult to achieve balanced compensation for the aberrations that develop in the overall lens system.

Condition (4) also relates to the amount of movement of the front lens group. If the upper limit of this condition is exceeded, the front lens group has to be moved by so great an amount as to make it impossible to attain one of the intended advantages of the invention (i.e., the need to advance the moving lens group by only a small amount). If, on the other hand, the lower limit of condition (4) is not reached, the necessary amount of front lens group movement is reduced, but then aberrations that are too extensive to compensate effectively will develop during focusing over the range from infinity to an image magnification of about ⅓.

Condition (5) relates to chromatic aberration. If this condition is not satisfied, the change in chromatic aberration that occurs as a result of the movement of the front lens group is too great to attain the object of the invention.

Three examples of the invention are shown below with reference to data sheets, in which $F_{NO}$ denotes the F number, f is the focal length, $\omega$ is the half viewing angle, $f_B$ is the back focus, r is the radius of curvature of an individual lens surface, d is the thickness of an individual lens or the axial distance between adjacent lenses, n is the refractive index of an individual lens at the d-line, $\nu$ is the Abbe number of an individual lens, and M is the image magnification.

EXAMPLE 1

$F_{NO} = 1:2.8$     $f = 100.00$
$\omega = 14.2°$     $f_B = 58.80$

| Surface No. | r | d | n | $\nu$ |
|---|---|---|---|---|
| 1 | 35.631 | 11.59 | 1.65844 | 50.9 |
| 2 | 470.382 | 4.70 | 1.78472 | 25.7 |
| 3 | 65.330 | 14.39 | | |
| 4 | 422.168 | 2.48 | 1.72825 | 28.5 |
| 5 | 42.969 | 4.32 | | |
| 6 | 63.854 | 6.40 | 1.80440 | 39.6 |
| 7 | −111.716 | 4.12 | | |
| 8 | 1175.955 | 2.94 | 1.51633 | 64.1 |
| 9 | 138.504 | | | |

$d_7 = 27.82$ when $M = -0.337$
$r_1/f = 0.36$     $\nu_1-\nu_2 = 25.20$
$f_F/f = 0.84$     $-f/f_R = 0.33$
$\nu_5 = 64.1$

EXAMPLE 2

$F_{NO} = 1:2.8$     $f = 100.00$
$\omega = 14.2°$     $f_B = 73.15$

| Surface No. | r | d | n | $\nu$ |
|---|---|---|---|---|
| 1 | 33.844 | 7.25 | 1.77250 | 49.6 |
| 2 | 210.816 | 4.53 | | |
| 3 | −238.299 | 2.92 | 1.66680 | 33.0 |
| 4 | 33.728 | 6.18 | | |
| 5 | 591.434 | 3.50 | 1.76182 | 26.6 |
| 6 | 54.732 | 3.12 | | |
| 7 | 62.116 | 8.17 | 1.78590 | 44.2 |
| 8 | −62.116 | 2.98 | | |
| 9 | −904.222 | 2.92 | 1.51633 | 64.1 |
| 10 | 246.930 | | | |

$d_8 = 26.70$ when $M = -0.339$
$r_1/f = 0.34$     $\nu_1-\nu_2 = 16.60$
$f_F/f = 0.84$     $-f/f_R = 0.27$
$\nu_5 = 64.1$

EXAMPLE 3

$F_{NO} = 1:2.8$     $f = 100.00$
$\omega = 13.9°$     $f_B = 60.17$

| Surface No. | r | d | n | $\nu$ |
|---|---|---|---|---|
| 1 | 39.712 | 12.86 | 1.74400 | 44.8 |
| 2 | −133.988 | 2.34 | 1.80518 | 25.4 |
| 3 | 71.186 | 19.09 | | |
| 4 | −64.909 | 2.34 | 1.70154 | 41.2 |
| 5 | 704.025 | 5.85 | 1.80400 | 46.6 |
| 6 | −50.163 | 2.98 | | |
| 7 | −528.641 | 2.92 | 1.51633 | 64.1 |
| 8 | 181.174 | | | |

$d_5 = 24.80$ when $M = -0.331$
$r_1/f = 0.40$     $\nu_1-\nu_2 = 19.4$
$f_F/f = 0.81$     $-f/f_R = 0.38$
$\nu_5 = 64.1$ As described above, the soft focus lens system of the invention which has a brightness on the order of $F_{NO}=1:2.8$ and a viewing angle on the order of 28 degrees has the advantages that the moving front lens group need be advanced by only a small amount and it is mechanically simple. In addition, if conditions (1)–(3), and optionally (4) and (5), are satisfied, a particularly good "soft" effect can be obtained.

What is claimed is:

1. A soft focus lens system, comprising:
   a front lens group having a positive overall power, and
   a rear lens group having a negative overall power and consisting of a single negative lens element, wherein only the front lens group is moved to perform focusing while the rear lens group remains fixed, said front lens group comprising, in order from an object side, a positive first lens element, a negative second lens element, a negative third lens element and a positive fourth lens element, said front lens group satisfying the following condition:

$0.7 < f_F/f < 0.95$, where
   f: a focal length of the overall lens system at infinity, and
   $f_F$: a focal length of the front lens group.

2. A soft focus lens system according to claim 1, wherein the front lens group further satisfies the following conditions:

$0.25 < r_1/f < 0.50$ $10 < \nu_1 - \nu_2 < 30$ where
   $r_1$: the radius of curvature of a first surface of the first lens; and
   $\nu_i$: the Abbe number of the ith lens.

3. A soft focus lens system according to claim 1, wherein the rear lens group exclusively comprises a single, negative fifth lens element and satisfies the following conditions:

$0.1 < -f/f_R < 0.5$ and $55 < v_5$ where $f_R$: the focal length of the rear lens group and $v_5$ represents the Abbe number of the fifth lens element.

4. A soft focus lens system according to claim 1, wherein the rear lens group satisfies the following condition:

$$0.1 - f/f_R < 0.5,$$

where $f_R$: a focal length of the rear group.

5. A soft focus lens system according to claim 1, wherein said front and rear lens groups provide an image magnification for close-up images approximately equal to ⅓.

6. A soft focus lens system according to claim 1, wherein the rear lens group further satisfies the following condition:

$$0.1 < -f/f_R < 0.5$$

where $f_R$: the focal length of the rear lens group.

7. A soft focus lens system according to claim 1, wherein the rear lens group comprises a fifth lens element and satisfies the following condition:

$$55 < v_5$$

where $v_5$ represents the Abbe number of the fifth lens element.

8. A soft focus lens system, comprising:
a front lens group having a positive overall power, and
a rear lens group having a negative overall power and consisting of a single negative lens element, wherein only the front lens group is moved to perform focusing while the rear lens group remains fixed, said front and rear lens groups providing image magnification of up to ⅓ for close-up image shots, said front lens group comprising, in order from an object side, a positive first lens element, a negative second lens element, a negative third lens element and a positive fourth lens element.

9. A soft focus lens system according to claim 8, wherein the rear lens group satisfies the following condition:

$$0.1 - f/f_R < 0.5,$$

where $f_R$: a focal length of the rear group.

10. A soft focus lens system according to claim 8, wherein the front lens group satisfies the following condition:

$$0.7 < f_F/f < 0.95,$$

where
f: a focal length of the overall lens system at infinity, and
$f_F$: a focal length of the front lens group.

11. A soft focus lens system according to claim 8, wherein the rear lens group comprises a fifth lens element and satisfies the following condition:

$$55 < v_5$$

where $v_5$ represents the Abbe number of the fifth lens element.

12. A soft focus lens system, comprising:
a front lens group having a positive overall power, and
a rear lens group having a negative overall power, wherein only the front lens group is moved to perform focusing while the rear lens group remains fixed, said front lens group comprising, in order from an object side, a positive first lens element, a negative second lens element, a negative third lens element and a positive fourth lens element, said rear lens group comprising a fifth lens element, said lens system satisfying the following conditions:

$$0.7 < f_F/f < 0.95,$$

and $$55 < v_5,$$

where
f: a focal length of the overall lens system at infinity,
$f_F$: a focal length of the front lens group and
$v_5$: the Abbe number of said fifth lens element.

13. A soft focus lens system according to claim 12, wherein the rear lens group consists of a single negative lens element.

14. A soft focus lens system according to claim 12, wherein the rear lens group further satisfies the following condition:

$$0.1 < -f/f_R < 0.5$$

where $f_R$: the focal length of the rear lens group.

15. A soft focus lens system, comprising:
a front lens group having a positive overall power, and
a rear lens group having a negative overall power, wherein only the front lens group is moved to perform focusing while the rear lens group remains fixed, said front and rear lens groups providing image magnification of up to ⅓ for close-up image shots, said front lens group comprising, in order from an object side, a positive first lens element, a negative second lens element, a negative third lens element and a positive fourth lens element, said rear lens group comprising a fifth lens element, said rear lens group satisfying the following condition:

$$55 < v_5$$

where $v_5$ represents an Abbe number of the fifth lens element.

16. A soft focus lens system, comprising:
a front lens group having a positive overall power, and
a rear lens group having a negative overall power, wherein only the front lens group is moved to perform focusing while the rear lens group remains fixed, said front lens group comprising, in order from an object side, a positive first lens element, a negative second lens element, a negative third lens element and a positive fourth lens element, said rear lens group comprising a fifth lens element, said front lens group satisfying the following conditions:

$$0.7 < f_F/f < 0.95$$

and $55 < \nu_5$, where
- f: a focal length of the overall lens system at infinity,
- $f_F$: a focal length of the front lens group, and
- $\nu_5$: an Abbe number of the fifth lens element.

17. A soft focus lens system, comprising:
a front lens group having a positive overall power, and
a rear lens group having a negative overall power, wherein only the front lens group is moved to perform focusing while the rear lens group remains fixed, said front lens group comprising, in order from an object side, a positive first lens element, a negative second lens element, a negative third lens element and a positive fourth lens element, said rear lens group exclusively comprising a single, negative fifth lens element, said lens system satisfying the following conditions:

$0.7 f_F/f < 0.95$ $0.1 < -f/f_R < 0.5$ and $55 < \nu_5$ where
- f: a focal length of the overall lens system at infinity,
- $f_F$: a focal length of the front lens group,
- $f_R$: the focal length of the rear lens group and
- $\nu_5$: the Abbe number of the fifth lens element.

* * * * *